United States Patent
Peedikakkal et al.

(10) Patent No.: US 11,891,406 B2
(45) Date of Patent: Feb. 6, 2024

(54) CONDUCTIVITY ENHANCEMENT OF MOFS VIA DEVELOPMENT OF MOFPOLYMER COMPOSITE MATERIAL

(71) Applicant: King Fahd University of Petroleum and Minerals, Dhahran (SA)

(72) Inventors: Abdul Malik P. Peedikakkal, Dhahran (SA); Abdul-Rahman Al-Betar, Dhahran (SA); Ammar Hussain Al-Mousa, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/561,515

(22) Filed: Sep. 5, 2019

(65) Prior Publication Data

US 2020/0291045 A1    Sep. 17, 2020

Related U.S. Application Data

(60) Provisional application No. 62/818,410, filed on Mar. 14, 2019.

(51) Int. Cl.

| | |
|---|---|
| *C07F 3/00* | (2006.01) |
| *C07F 3/06* | (2006.01) |
| *C08L 79/02* | (2006.01) |
| *H01G 11/48* | (2013.01) |
| *C08G 83/00* | (2006.01) |
| *H01M 4/60* | (2006.01) |

(52) U.S. Cl.
CPC ............ *C07F 3/003* (2013.01); *C08G 83/008* (2013.01); *C08L 79/02* (2013.01); *H01G 11/48* (2013.01); *H01M 4/606* (2013.01)

(58) Field of Classification Search
CPC ............ C08L 79/02; H01G 11/48; C07F 3/06
See application file for complete search history.

(56) References Cited

U.S. PATENT DOCUMENTS 7,815,716 B2    10/2010  Mueller et al.

FOREIGN PATENT DOCUMENTS

| CN | 108067278 | * | 5/2018 | ............ B01J 27/24 |
| CN | 108067278 A | * | 5/2018 | |
| CN | 108786755 A | | 11/2018 | |

OTHER PUBLICATIONS

Liu et al. J. Am. Chem. Soc. 2008, 130, 5390-5391.*
Lin et al. ACS Appl. Mater. Interfaces 2019, 11, 3400-3406, published on Dec. 24, 2018.*
CN-108067278 machine translation from Google patents translation from Nov. 21, 2020.*
A. Kumar et al J. Phys.: Conf. Ser. 1531 012108 (2020)("Kumar") (Year: 2020).*
M. Bisercic et al., 262 Synthetic Metals (2020) (Year: 2020).*
Guo, et al. ; (Metal-Organic Framework)-Polyaniline sandwich structure composites as novel hybrid electrode materials for high-performance supercapacitor ; Journal of Power Sources vol. 316 ; pp. 176-182 ; Jun. 1, 2016 ; Abstract Only ; 2 Pages.
Lin, et al. ; Zr-MOF/Polyaniline Composite Films with Exceptional Seebeck Coefficient for Thermoelectric Material Applications ; Applied Materials & Interfaces 11(3) ; pp. 3400-3406 ; 2019 ; Abstract Only ; 2 Pages.
Neisi, et al. ; Polyaniline/Cu(II) Metal-organic Frameworks Composite for High Performance Supercapacitor Electrode ; Journal of Inorganic and Organometallic Polymers and Materials ; pp. 1-10 ; Apr. 1, 2019 ; Abstract Only ; 2 Pages.
www.acsynam.com/shop/metal-organic-frameworks/mof-f/ ; MOF-5—ACSYNAM ; Product ; Jun. 11, 2019 ; 2 Pages.

* cited by examiner

*Primary Examiner* — Alexander R Pagano
*Assistant Examiner* — Frank S. Hou
(74) *Attorney, Agent, or Firm* — Oblon, McClelland, Maier & Neustadt, L.L.P.

(57) ABSTRACT

A method for enhancing the conductivity of MOF-5 by the development of an MOF-5 polymer composite material. The composite material incorporates a conductive polymer, preferably polyaniline, in the solvo-thermal synthesis pathway of MOF-5. The electrically conductive MOF-5 composite exhibits electric conductivity three orders of magnitude higher than that of MOF-5 while maintaining the crystallinity, robustness, and thermal stability of MOF-5.

4 Claims, 8 Drawing Sheets

CONDUCTIVITY ENHANCEMENT OF MOFS VIA DEVELOPMENT OF MOFPOLYMER COMPOSITE MATERIAL

CROSS REFERENCE TO RELATED APPLICATION

This application claims priority of U.S. Provisional Patent Application Ser. No. 62/818,410 filed on Mar. 14, 2019, the entirety of which is incorporated herein by reference.

BACKGROUND

Technical Field

The present disclosure is directed to an electric conductive composite comprising polyaniline and a metal-organic framework MOF-5 having the formula $Zn_4O(BDC)_3$, where BDC is 1,4-benzenedicarboxylate.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Metal organic frameworks (MOFs) have been the focus of research in the past two decades. MOF-5 is considered the father of MOFs and is the most prominent example of this material due to its high surface area, simple cubic structure, high stability, and it status as a well-established and studied material. (See D. J. Tranchemontagne, J. R. Hunt and O. M. Yaghi, "Room temperature synthesis of metal-organic frameworks: MOF-5, MOF-74, MOF-177, MOF-199, and IRMOF-0", ChemInform, 2008, 39; Civalleri, F. Napoli, Y. Noël, C. Roetti and R. Dovesi, "Ab-initio prediction of materials properties with CRYSTAL: MOF-5 as a case study", CrystEngComm, 2006, 8, 364-371, each incorporated herein by reference in their entirety).

The implementation of conductivity in MOFs is exceedingly significant, but still in an early stage of development. The addition of conductive and electrical properties to MOF has been of interest because in its normal state it is nonconductive and has a high resistance. Efforts have been made toward increasing conductivity by the incorporation of conductive materials into the MOF matrix. The conductive polymer, polyaniline (PANi) exhibits high conductivity in its oxidized/protonated form, shows sufficient solubility in dimethylformamide (DMF), possesses high environmental stability, and finally good electrochemical reversibility. (See H. Li, M. Eddaoudi, M. Okeeffe and O. M. Yaghi, "Design and synthesis of an exceptionally stable and highly porous metal-organic framework", Nature, 1999, 402, 276-279; O. Fleker, A. Borenstein, R. Lavi, L. Benisvy, S. Ruthstein and D. Aurbach, "Preparation and Properties of Metal Organic Framework/Activated Carbon Composite Materials", Langmuir, 2016, 32, 4935-4944; D. Sheberla, J. C. Bachman, J. S. Elias, C.-J. Sun, Y. Shao-Horn and M. Dincă, "Conductive MOF electrodes for stable supercapacitors with high areal capacitance", Natural Materials, 2016, 16, 220-224; Y. Mohd, R. Ibrahim and M. F. Zainal, "Electrodeposition and characterization of Polyaniline films", 2012 IEEE Symposium on Humanities, Science and Engineering Research, 2012, each incorporated herein by reference in its entirety).

The conductivity of unsynthesized MOFs has been reported, as well as increased conductivity of MOF-1 when synthesized with polyvinylpyrrolidone (PVP). (See X. Liang, F. Zhang, W. Feng, X. Zou, C. Zhao, H. Na, C. Liu, F. Sun and G. Zhu, "From metal-organic framework (MOF) to MOF-polymer composite membrane: enhancement of low-humidity proton conductivity", Chem. Sci., 2013, 4, 983-992, incorporated herein by reference in its entirety).

The present disclosure provides a technique in which a conductive polymer may be synthesized in a solvo-thermal process to form a conductive metal organic framework, MOF. The conductive polymer may be polyaniline, PANi, and the MOF may be MOF-5, which when synthesized and then implemented in a solvo-thermal synthesis form a conductive MOF-5 composite material which exhibits intergrowth of MOF-5 with the polymer. The MOF-5 composite material demonstrates three orders of magnitude higher conductivity compared to that of MOF-5 alone. This synthesis of polyaniline with MOF-5 provides a material that combines the stability, robustness, and flexibility of MOF-5 with the conductive properties of polyaniline (PANi).

SUMMARY

An exemplary embodiment is drawn to an electrically conductive composite material comprising polyaniline and a metal-organic framework (MOF-5) having the formula $Zn_4O(BDC)_3$, where BDC is 1,4-benzenedicarboxylate. This composite material has a high electric conductivity, in the range of $2.0 \times 10^{-9}$ to $9.0 \times 10^{-9}$ S cm$^{-1}$.

In another exemplary embodiment, a method includes forming an electrically conductive composite of metal-organic framework MOF-5, by synthesizing MOF-5 with polyaniline (PANi) to form the electrically conductive MOF-5 composite.

In another exemplary embodiment, a method of forming an electrically conductive composite of metal-organic framework (MOF) includes synthesizing an MOF with a conductive polymer by a solvo-thermal process to form an electrically conductive MOF composite.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
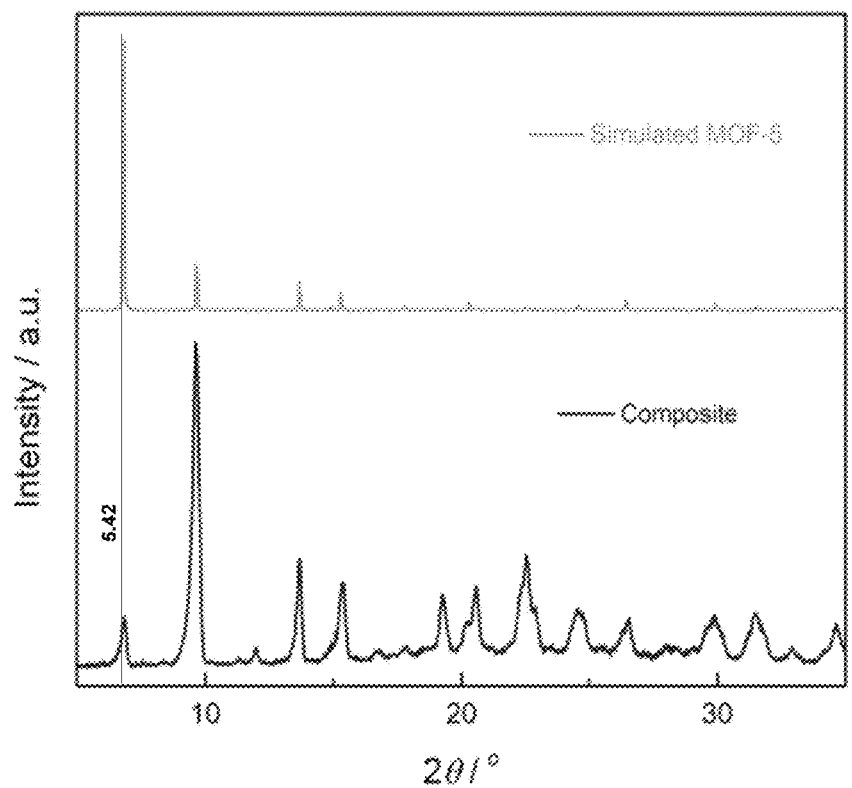
FIG. 1 is a graph illustrating the experimental Powder X-Ray Diffraction (PXRD) pattern for composite material and a simulated pattern for MOF-5.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

The pores of a metal-organic framework (MOF) material can be occupied by a polymer formed in the pores or disposed in the pores by deposition such as by solvent evaporation. A substance (such as an ionic liquid) can be captured within the metal-organic framework material via adsorption to the polymer formed in the pores of the framework material. Take up of the substance in the presence of the polymer can proceed at comparatively low pressures and can have varied uses, such as for electrodes.

Additionally, the take up of the substance can proceed with its storage and release in the framework material at elevated temperatures.

Metal-organic framework materials comprise pores, in particular micropores and/or mesopores. Micropores are defined as those having a diameter of 2 nm or less and mesopores are defined by a diameter in the range from 2 to 50 nm.

The lengths of the principal axes, or edges, of the unit cell and the angles between the edges of the metallic-organic framework are called the lattice constants. The symmetry properties of the crystal lattice are described by the concept of space groups. The corresponding crystal structure is described in terms of the geometry of the arrangement of particles in the unit cell. The unit cell is defined as the smallest repeating unit having the full symmetry of the crystal structure. The geometry of the unit cell is defined as a parallelepiped, providing six lattice parameters taken as the lengths of the cell edges (a, b, c) and the angles between them ($\alpha$, $\beta$, $\gamma$). The positions of particles inside the unit cell are described by the fractional coordinates ($x_i$, $y_i$, $z_i$) along the cell edges, measured from a reference point. It is only necessary to report the coordinates of a smallest asymmetric subset of particles. This group of particles may be chosen so that it occupies the smallest physical space, which means that not all particles need to be physically located inside the boundaries given by the lattice parameters. All other particles of the unit cell are generated by the symmetry operations that characterize the symmetry of the unit cell. The collection of symmetry operations of the unit cell is expressed formally as the space group of the crystal structure.

Some examples of metal-organic framework material properties are given in Table I. The MOF, the metal and also the bidentate ligand, the solvent, the cell parameters (angles $\alpha$, $\beta$, $\gamma$ and also the lattice distances A, B and C) and space group are given. The latter were determined by X-ray diffraction. (See U.S. Pat. No. 7,815,716, incorporated herein by reference in its entirety).

TABLE I

Chemical Properties of MOFs.

| MOF-n | Constituents molar ratio M + L | Solvents | $\alpha$ | $\beta$ | $\gamma$ | a | b | c | Space group |
|---|---|---|---|---|---|---|---|---|---|
| MOF-0 | Zn(NO$_3$)$_2$·6H$_2$O H$_3$(BTC) | Ethanol | 90 | 90 | 120 | 16.711 | 16.711 | 14.189 | P6(3)/Mcm |
| MOF-2 | Zn(NO$_3$)$_2$·6H$_2$O (0.246 mmol) H$_2$(BDC) (0.241 mmol) | DMF Toluene | 90 | 102.8 | 90 | 6.718 | 15.49 | 12.43 | P2(1)/n |
| MOF-3 | Zn(NO$_3$)$_2$·6H$_2$O (1.89 mmol) H$_2$(BDC) (1.93 mmol) | DMF MeOH | 99.72 | 111.11 | 108.4 | 9.726 | 9.911 | 10.45 | P-1 |
| MOF-4 | Zn(NO$_3$)$_2$·6H$_2$O (1.00 mmol) H$_3$(BTC) (0.5 mmol) | Ethanol | 90 | 90 | 90 | 14.728 | 14.728 | 14.728 | P2(1)3 |
| MOF-5 | Zn(NO$_3$)$_2$·6H$_2$O (2.22 mmol) H$_2$(BDC) (2.17 mmol) | DMF Chlorobenzene | 90 | 90 | 90 | 25.669 | 25.669 | 25.669 | Fm-3m |
| MOF-38 | Zn(NO$_3$)$_2$·6H$_2$O (0.27 mmol) H$_3$(BTC) (0.15 mmol) | DMF Chlorobenzene | 90 | 90 | 90 | 20.657 | 20.657 | 17.84 | I4cm |

TABLE I-continued

Chemical Properties of MOFs.

| MOF-n | Constituents molar ratio M + L | Solvents | α | β | γ | a | b | c | Space group |
|---|---|---|---|---|---|---|---|---|---|
| MOF-31 Zn(ADC)$_2$ | Zn(NO$_3$)$_2$·6H$_2$O 0.4 mmol H$_2$(ADC) 0.8 mmol | Ethanol | 90 | 90 | 90 | 10.821 | 10.821 | 10.821 | Pn(-3)m |
| MOF-12 Zn$_2$(ATC) | Zn(NO$_3$)$_2$·6H$_2$O 0.3 mmol H$_4$(ATC) 0.15 mmol | Ethanol | 90 | 90 | 90 | 15.745 | 16.907 | 18.167 | Pbca |
| MOF-20 ZnNDC | Zn(NO$_3$)$_2$·6H$_2$O 0.37 mmol H$_2$NDC 0.36 mmol | DMF Chlorobenzene | 90 | 92.13 | 90 | 8.13 | 16.444 | 12.807 | P2(1)/c |
| MOF-37 | Zn(NO$_3$)$_2$·6H$_2$O 0.2 mmol H$_2$NDC 0.2 mmol | DEF Chlorobenzene | 72.38 | 83.16 | 84.33 | 9.952 | 11.576 | 15.556 | P-1 |
| MOF-9 Tb$_2$(ADC) | Tb(NO$_3$)$_3$·5H$_2$O 0.08 mmol H$_2$ADB 0.12 mmol | DMSO | 90 | 102.09 | 90 | 27.056 | 16.795 | 28.139 | C2/c |
| MOF-6 | Tb(NO$_3$)$_3$·5H$_2$O 0.30 mmol H$_2$(BDC) 0.30 mmol | DMF MeOH | 90 | 91.28 | 90 | 17.599 | 19.996 | 10.545 | P21/c |
| MOF-7 | Tb(NO$_3$)$_3$·5H$_2$O 0.15 mmol H$_2$(BDC) 0.15 mmol | H$_2$O | 102.3 | 91.12 | 101.5 | 6.142 | 10.069 | 10.096 | P-1 |
| MOF-69A | Zn(NO$_3$)$_2$·6H$_2$O 0.083 mmol 4,4'-BPDC 0.041 mmol | DEF H$_2$O$_2$ MeNH$_2$ | 90 | 111.6 | 90 | 23.12 | 20.92 | 12 | C2/c |
| MOF-69B | Zn(NO$_3$)$_2$·6H$_2$O 0.083 mmol 2,6-NCD 0.041 mmol | DEF H$_2$O$_2$ MeNH$_2$ | 90 | 95.3 | 90 | 20.17 | 18.55 | 12.16 | C2/c |
| MOF-11 Cu$_2$(ATC) | Cu(NO$_3$)$_2$·2.5H$_2$O 0.47 mmol H$_2$ATC 0.22 mmol | H$_2$O | 90 | 93.86 | 90 | 12.987 | 11.22 | 11.336 | C2/c |
| MOF-11 Cu$_2$(ATC) dehydr. | | | 90 | 90 | 90 | 8.4671 | 8.4671 | 14.44 | P42/mmc |
| MOF-14 Cu$_3$(BTB) | Cu(NO$_3$)$_2$·2.5H$_2$O 0.28 mmol H$_3$BTB 0.052 mmol | H$_2$O DMF EtOH | 90 | 90 | 90 | 26.946 | 26.946 | 26.946 | Im-3 |
| MOF-32 Cd(ATC) | Cd(NO$_3$)$_2$·4H$_2$O 0.24 mmol H$_4$ATC 0.10 mmol | H$_2$O NaOH | 90 | 90 | 90 | 13.468 | 13.468 | 13.468 | P(-4)3m |
| MOF-33 Zn$_2$(ATB) | ZnCl$_2$ 0.15 mmol H$_4$ATB 0.02 mmol | H$_2$O DMF EtOH | 90 | 90 | 90 | 19.561 | 15.255 | 23.404 | Imma |
| MOF-34 Ni(ATC) | Ni(NO$_3$)$_2$·6H$_2$O 0.24 mmol H$_4$ATC 0.10 mmol | H$_2$O NaOH | 90 | 90 | 90 | 10.066 | 11.163 | 19.201 | P2$_1$2$_1$2$_1$ |
| MOF-36 Zn$_2$(MTB) | Zn(NO$_3$)$_2$·4H$_2$O 0.20 mmol H$_4$MTB 0.04 mmol | H$_2$O DMF | 90 | 90 | 90 | 15.745 | 16.907 | 18.167 | Pbca |
| MOF-39 Zn$_3$O (HBTB) | Zn(NO$_3$)$_2$·4H$_2$O 0.27 mmol H$_3$BTB 0.07 mmol | H$_2$O DMF EtOH | 90 | 90 | 90 | 17.158 | 21.591 | 25.308 | Pnma |

The metal organic framework material may be selected from the group comprising MOF-0, MOF-2 MOF-3, MOF-4, MOF-5, MOF-6, MOF-7, MOF-9, MOF-11, MOF-12, MOF-14, MOF-20, MOF-31, MOF-32, MOF-33, MOF-34, MOF-36, MOF-37, MOF-38, MOF-39, MOF-69A and MOF-69B.

The metal component in the framework material is preferably selected from the groups Ia, IIa, IIIa, IVa to VIIIa and Ib to VIb. Particular preference is given to Mg, Ca, Sr, Ba, Sc, Y, Ti, Zr, Hf, V, Nb, Ta, Cr, Mo, W, Mn, Re, Fe, Ro, Os, Co, Rh, Ir, Ni, Pd, Pt, Cu, Ag, Au, Zn, Cd, Hg, B, Al, Ga, In, Tl, Si, Ge, Sn, Pb, As, Sb and Bi. More preference is given to Zn, Al, Mg, Ca, Cu, Ni, Fe, Pd, Pt, Ru, Rh and Co. In particular preference is given to Zn, Al, Ni, Cu, Mg, Ca, Fe. With respect to the ions of these elements, those which may particularly be mentioned are $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $OS^{3+}$, $OS^{2+}$, $Co^{3+}$, $Co^{2+}$, $Rh^{2+}$, $Rh^{+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb^{5+}$, $Sb^{3+}$, $Sb^{+}$, $Bi^{5+}$, $Bi^{3+}$ and $Bi^{+}$.

The term "at least bidentate organic compound" designates an organic compound which comprises at least one functional group which is able to form, to a given metal ion, at least two, preferably two, coordinate bonds, and/or to two or more, preferably two metal atoms, in each case one coordinate bond.

Suitable solvents for producing the MOFs are any one of the group comprising ethanol, dimethylformamide, toluene, methanol, chlorobenzene, diethylformamide, dimethyl sulfoxide, water, hydrogen peroxide, methylamine, sodium hydroxide solution, N-methylpolidone ether, acetonitrile, benzyl chloride, triethylamine, ethylene glycol and mixtures thereof. As seen in Table 1, dimethylformamide (DMF) and chlorobenzene are the solvents suitable for MOF-5.

For example, in the context of the present disclosure, dicarboxylic acids are used to form bi- or multi-dentate ligands. Dicarboxylic acids include compounds such as oxalic acid, succinic acid, tartaric acid, 1,4-butanedicarboxylic acid, 4-oxopyran-2,6-dicarboxylic acid, 1,6-hexanedicarboxylic acid, decanedicarboxylic acid, 1,8-heptadecanedicarboxylic acid, 1,9-heptadecanedicarboxylic acid, heptadecanedicarboxylic acid, acetylenedicarboxylic acid, 1,2-benzenedicarboxylic acid, 2,3-pyridinedicarboxylic acid, pyridine-2,3-dicarboxylic acid, 1,3-butadiene-1,4-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diaminophenylmethane-3,3'-dicarboxylic acid, quinoline-3,4-dicarboxylic acid, 7-chloro-4-hydroxyquinoline-2,8-dicarboxylic acid, diimidodicarboxylic acid, pyridine-2,6-dicarboxylic acid, 2-dethylimidazole-4,5-dicarboxylic acid, thiophene-3,4-dicarboxylic acid, 2-isopropylimidazole-4,5-dicarboxylic acid, tetrahydropyran-4,4-dicarboxylic acid, perylene-3,9-dicarboxylic acid, perylenedicarboxylic acid, Pluriol E 200 dicarboxylic acid, 3,6-dioxaoctanedicarboxylic acid, 3,5-cyclohexadiene-1,2-dicarboxylic acid, octadicarboxylic acid, pentane-3,3-carboxylic acid, 4,4'-diamino-1,1',biphenyl-3,3'-dicarboxylic acid, 4,4'-diaminobiphenyl-3,3' dicarboxylic acid, benzidine-3,3'-dicarboxylic acid, 1,4-bi(phenylamino)benzene-2,5-dicarboxylic acid, 1,1'-binaphthyl-dicarboxylic acid, 7-chloro-8-methylquinoline-2,3-dicarboxylic acid, 1-anilinoanthraquinone-2,4'-dicarboxylic acid, polytetrahydrofuran-250-dicarboxylic acid, 1,4-bis(carboxy-methyl)piperazine-2,3-dicarboxylic acid, 7-chloroquinoline-3,8-dicarboxylic acid, 1-(4-carboxy)phenyl-3-(4-chloro)phenylpyrazoline-4,5-dicarboxylic acid, 1,4,5,6,7,7-hexa-chloro-5-norbornene-2,3-dicarboxylic acid, phenylindanedicarboxylic acid, 1,3-dibenzyl-2-oxoimidazolidine-4,5-dicarboxylic acid, 1,4-cyclohexanedicarboxylic acid, naphthalene-1,8-dicarboxylic acid, 2-benzoylbenzene-1,3-dicarboxylic acid, 1,3-dibenzyl-2-oxoimidazolidine-4,5-cis-dicarboxylic acid, 2,2'-biquinoline-4,4'-dicarboxylic acid, pyridine-3,4-dicarboxylic acid, 3,6,9-trioxaundecanedicarboxylic acid, hydroxybenzophenonedicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, 4,4'-diaminodiphenyletherdiimidodicarboxylic acid, 4,4'-diaminodiphenyl-methanediimidodicarboxylic acid, 4,4'-diaminodiphenyl-sulfonediimidodicarboxylic acid, 2,6-naphthalenedicarboxylic acid, 1,3-adamantanedicarboxylic acid, 1,8-naphthalene-dicarboxylic acid, 2,3-naphthalenedicarboxylic acid, 8-methoxy-2,3-naphthalenedicarboxylic acid, 8-nitro-2,3-naphthalenecarboxylic acid, 8-sulfo-2,3-naphthalenedicarboxylic acid, anthracene-2,3-dicarboxylic acid, 2',3'-diphenyl-p-terphenyl-4,4"-dicarboxylic acid, diphenylether-4,4'-dicarboxylic acid, imidazole-4,5-dicarboxylic acid, 4(1H)-oxothio-chromene-2,8-dicarboxylic acid, 5-tert-butyl-1,3-benzenedicarboxylic acid, 7,8-quinolinedicarboxylic acid, 4,5-imidazoledicarboxylic acid, 4-cyclohexene-1,2-dicarboxylic acid, hexatriacontanedicarboxylic acid, tetradecanedicarboxylic acid, 1,7-heptadicarboxylic acid, 5-hydroxy-1,3-benzenedicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxydiphenylmethane-3,3'-dicarboxylic acid, 1-amino-4-methyl-9,10-dioxo-9,10-dihydroanthracene-2,3-dicarboxylic acid, 2,5-pyridinedicarboxylic acid, cyclohexene-2,3-dicarboxylic acid, 2,9-dichlorofluorubin-4,11-dicarboxylic acid, 7-chloro-3-methylquinoline-6,8-dicarboxylic acid, 2,4-dichlorobenzophenone-2',5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid, 1,14-tetradecanedicarboxylic acid, 5,6-dehydro-norbornane-2,3-dicarboxylic acid or 5-ethyl-2,3-pyridinedicarboxylic acid.

Preferably, the polymer comprises double bonds, very particularly preferably conjugated double bonds, and in particular aromatic rings and/or functional groups, such as ether, sulfide, amine, ester, amide, sulfamide, carbonate, urethane groups.

The polymer is an electrically conducting polymer, preferably selected from the group of polyaniline, polpyrrole, polyacetylene and polyindole. The polymer is most preferably polyaniline, which has a high conductivity.

The pore size of the MOF can be controlled by the selection of a suitable ligand and/or a suitable at least bidentate organic compound. It is generally true that the larger the organic compound, the greater the pore size. Preferably, the pore size is 0.2 nm to 30 nm, particularly preferably the pore size is in the range from 0.3 nm to 3 nm, based on the crystalline material. Other pore sizes include 0.4 nm to 20 nm, preferably 0.5 nm to 4 nm, 0.7 nm to 5 nm, or 1.0 nm to 2 nm.

The MOF can be integrated with a conductive material by solvo-thermal synthesis. Solvo-thermal synthesis is a method of producing chemical compounds. It is similar to hydrothermal synthesis (where the synthesis is conducted in a stainless steel autoclave) with the difference that the precursor solution is non-aqueous. Using solvo-thermal synthesis yields the benefits of both sol-gel and hydrothermal routes. Solvo-thermal synthesis allows for precise control over the size, shape distribution, and crystallinity of metal oxide nanoparticles or nanostructure products. These characteristics can be altered by changing certain experimental parameters, including reaction temperature, reaction time, solvent type, surfactant type, and precursor type.

Aspects of the present disclosure are directed to an electrically conductive composite material, a method of forming an electrically conductive composite of metal-organic framework MOF-5 and a method of forming an electrically conductive composite of metal-organic framework MOF. Additionally, aspects describe an approach for enhancing the conductivity of MOFs, which has been demonstrated by the development of an MOF-5/conductive polymer composite material. The composite material was formed via incorporation of the conductive polymer, polyaniline, in a solvo-thermal synthesis pathway with MOF-5. The prepared composite exhibits remarkably high electric conductivity, $4.69 \times 10^{-9}$ S cm$^{-1}$, which is three orders of magnitude higher than that of MOF-5 alone while maintaining the crystallinity, robustness, and thermal stability of MOF-5. The conductivity enhancement of MOF materials yields stable, high conductivity materials which may be useful in various electronic applications, batteries and supercapacitors etc.

MOF-5 consists of $Zn_4O$ units connected by linear 1,4-benzenedicarboxylate struts to form a cubic network. MOF-5 has the properties of ultrahigh porosity and open metal sites.

Aniline is an organic compound with the formula $C_6H_5NH_2$. Consisting of a phenyl group attached to an amino group, aniline is the prototypical aromatic amine.

Polyaniline (PANi) is a conducting polymer of the semi-flexible rod polymer family. PANi is polymerized from aniline and is one of the most intensively investigated conducting polymers due to its excellent environmental stability, ease of synthesis, and relatively high level of electrical conductivity. PANi has been widely studied for potential applications in many domains such as electrochromic devices, rechargeable batteries, electromagnetic interference shielding, and sensors.

In an aspect of the present disclosure, PANi is synthesized and then implemented in a solvo-thermal synthesis procedure with MOF-5. The resulting conductive polymer/MOF-5 composite material exhibits intergrowth of MOF-5 with the polymer.

Synthesis of Polyaniline (PANi)

A three electrode electrochemical cell dipped in an electrolytic solution was prepared. The electrolytic solution used 0.5 M NaCl, 0.5 M sulfuric acid, and 0.5 M of aniline monomer.

Figure 9:
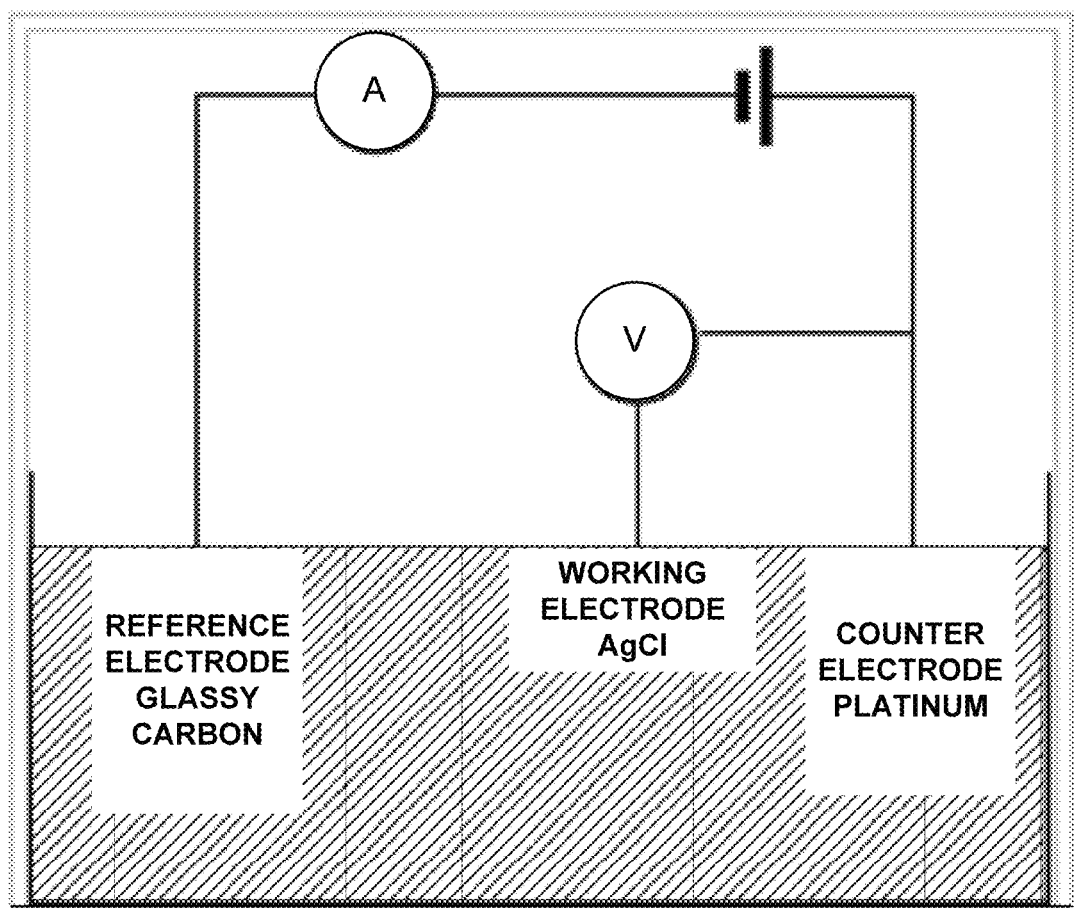
FIG. 9 illustrates the electrode arrangement.

The three electrodes used were glassy carbon, platinum, and Ag/AgCl as working, counter, and reference electrodes respectively as shown in FIG. 9. The platinum electrode was spaced one centimeter from the working electrode. All potentials were referred to the Ag/AgCl electrode. The aniline was polymerized onto the glassy carbon using cyclic voltammetry for 15 cycles at a scan rate of 0.1 V/s. Blue emeraldine base PANi was observed forming on the glassy carbon electrode during the cycling. A total of 0.3 mg of PANi was formed on the electrode.

The thickness of the polymer layer formed can be calculated from the equation:

$$d = QMw/zFA\rho,$$

where Q is the charge; Mw is the molecular weight of monomer; z is the number of electrons/monomer unit; A is the area of the electrode; $\rho$ is the specific density of monomer; F is Faraday's constant. ((See K. E. Ramohlola, M. Masikini, S. B. Mdluli, G. R. Monama, M. J. Hato, K. M. Molapo, E. I. Iwuoha and K. D. Modibane, "*Carbon-related Materials in Recognition of Nobel Lectures by Prof. Akira Suzuki*" in ICCE, 2017, 373-389, incorporated herein by reference in its entirety).

Synthesis of MOF-5

Zinc nitrate hexahydrate (340 mg), 1,4-benzenedicarboxylic acid (127 mg) and N,N-dimethylformamide (20 mL) were placed in a 30 mL glass vial. The vessel was capped tightly with a Teflon-lined lid, sonicated for 5 mins and then placed in an oven set at 100° C. for 24 hrs. After this time, colorless, cubic crystals were observed on the vial walls. The jar was removed from the oven and reaction mixture was allowed to cool to room temperature. Once cooled, the mother liquor was decanted from the crystalline material, and the white solid was washed with 50 mL of dimethylformamide (DMF) by letting the solid soak in DMF for 3 hrs. The solid was filtered and washed again with fresh DMF. The filtrate was weighed to be 350 mg. Powder x-ray diffraction measurements were taken.

Synthesis of Composite 0.3 mg of PANi were dissolved in 10 mL of DMF in a 30 mL beaker, labeled A. The solution was sonicated for 5 minutes until it completely dissolved (clear). 1,4-benzenedicarboxylic acid (127 mg) was then added to solution A and sonicated for 7 minutes until the solution was clear. Zinc nitrate hexahydrate (340 mg) was placed in another beaker, labeled B, with 10 mL of DMF. Solution B was sonicated for 5 minutes until it was clear. Solutions A and B were transferred to a 30 mL glass vial. The vessel was capped tightly with a Teflon-lined lid. Despite sonication for more than 10 minutes, the resulting solution remained blue and cloudy. Consequently, it was placed in an oven set at 100 degrees C. for 24 hrs. After this time, the vial was removed from the oven and the reaction mixture was allowed to cool to room temperature. Once cooled, the solution was filtered and the resulting gray colored solid was washed with DMF. The solid was soaked in 30 mL of DMF for 3 hours. The sample was filtered again and washed with fresh DMF. The filtrate was weighed to be 362 mg.

A first embodiment is illustrated with respect to FIG. 4A-4D, FIG. 5. The first embodiment describes an electrically conductive composite material (FIG. 4A-4D) comprising polyaniline and a metal-organic framework (MOF-5) (FIG. 5) having the formula Zn4O(BDC)3, where BDC is 1,4-benzenedicarboxylate, which has an electric conductivity in the range of $2.0 \times 10^{-9}$ to $9.0 \times 10^{-9}$ S cm−1. The electrically conductive material may be used to form an electrode or an electromagnetic interference shield.

A second embodiment is illustrated with respect to FIG. 4A-4D, FIG. 5 and FIG. 9. The second embodiment describes a method of forming an electrically conductive composite (FIG. 4A-4D) of metal-organic framework MOF-5 (FIG. 5), comprising synthesizing MOF-5 with polyaniline (PANi) to form the electrically conductive composite.

The method comprises first synthesizing polyaniline (PANi) by preparing a solution of sodium chloride, sulfuric acid and aniline monomer in an electrochemical cell containing an Ag/AgCl working electrode, a platinum counter electrode, and a glassy carbon reference electrode as shown in FIG. 9; polymerizing the aniline in the solution by using cyclic voltammetry for a number of cycles in the range of 10 to 20 cycles at a scanning rate of 0.01 to 0.9 V/s, and collecting the synthesizd polyaniline deposited on the glassy carbon electrode.

MOF-5 is synthesized by mixing, by sonication, a solution of zinc nitrate hexahydrate, 1,4-benzenedicarboxylic acid and N,N dimethylformamide; solvo-thermal processing, in an oven, the solution to form MOF-5 crystals; cooling the solution; and filtering the cooled solution to collect the synthesized MOF-5 crystals.

The composite is synthesized by mixing, by sonication, a first solution of polyaniline and dimethylformamide to form a second solution; mixing, by sonication, the second solution with 1,4-dicarboxylic acid; mixing, by sonication, a third solution of zinc nitrate hexahydrate with dimethylformamide; mixing, by sonication, the second and third solutions to form a fourth solution; solvo-thermal processing, in an oven, the fourth solution at a temperature in the range of 80-120° C. for a time in the range 12-48 hours; cooling the fourth solution; and filtering and washing the cooled fourth solution to isolate the electrically conductive composite.

Mixing the composite comprises sonicating the first solution for a time in the range of 5-7 minutes; sonicating the second solution for a time in the range of 6-10 minutes, sonicating the third solution for a time in the range of 5-7 minutes and sonicating the fourth solution for a time in the range of 10-15 minutes.

Washing the composite comprises soaking the fourth solution in dimethylformamide for a time in the range of 2-4 hours. The composite may be refiltered and washed again in dimethylformamide.

In an alternative embodiment, the polyaniline is not required to be synthesized by the method above. In a non-limiting example, the polyaniline may be purchased from a supplier. (See Sigma Aldrich, PO Box 14508, St. Louis, MO 63178, USA, https://www.sigmaaldrich.com/catalog/product/aldrich/428329?lang=en&region=US).

In an alternative embodiment, the MOF-5 is not required to be synthesized by the method above. (See also ACSYNAM, MOF-5, Montreal, Quebec, Canada, http://www.acsynam.com/shop/metal-organic-frameworks/mof-5/).

The method may include both synthesizing the polyaniline and synthesizing the MOF-5. In this aspect, synthesizing the MOF-5 comprises mixing, by sonication, a second solution of zinc nitrate hexahydrate, 1,4-benzenedicarboxylic acid and N,N dimethylformamide; solvo-thermal processing, in an oven, the second solution to form MOF-5 crystals; cooling the second solution; and filtering the cooled second solution to collect the synthesized MOF-5 crystals. The electrically conductive composite is then synthesized by mixing, by sonication, a third solution of polyaniline and dimethylformamide to form a fourth solution; mixing, by sonication, the fourth solution with 1,4-dicarboxylic acid; mixing, by sonication, a fifth solution of zinc nitrate hexahydrate with imethylformamide; mixing, by sonication, the fourth and fifth solutions to form a sixth solution; solvo-thermal processing, in an oven, the sixth solution at a temperature in the range of 80-120° C. for a time in the range 12-48 hours; cooling the fourth solution; and filtering and washing the cooled fourth solution to isolate the electrically conductive composite.

A third embodiment is illustrated with respect to FIG. 4A-4D, FIG. 5 and FIG. 9. The third embodiment describes a method of forming an electrically conductive composite of metal-organic framework (MOF), comprising synthesizing an MOF with a conductive polymer by a solvo-thermal process.

The third embodiment may include synthesizing the composite by mixing, by sonification, a first solution of polyaniline (PANi), dimethylformamide (DMF) and 1,4-dicarboxylic acid; mixing, by sonification, a second solution of zinc nitrate hexahydrate with dimethylformamide; mixing, by sonification, the first and second solution to form a third solution; solvo-thermal processing, in an oven, the third solution at a temperature in the range of 80-120° C. for a time in the range 12-48 hours; cooling the third solution; and filtering and washing the cooled third solution to isolate the electrically conductive composite, where the composite is an electrically conductive MOF-5 composite.

Alternatively, the third embodiment may include synthesizing the composite by mixing, by sonification, a first solution of conductive polymer, a first quantity of a solvent, and a dicarboxylic acid; mixing, by sonification, a second solution of zinc nitrate hexahydrate with a second quantity of the solvent; mixing, by sonification, the first and second solution to form a third solution; solvo-thermal processing, in an oven, the third solution; cooling the third solution; and filtering and washing the cooled third solution to isolate the electrically conductive composite, where the composite is an electrically conductive MOF composite. In this embodiment, the solvent may be selected from the group comprising ethanol, dimethylformamide, toluene, methanol, chlorobenzene, diethylformamide, dimethyl sulfoxide, water, hydrogen peroxide, methylamine, sodium hydroxide solution, N-methylpolidone ether, acetonitrile, benzyl chloride, triethylamine, ethylene glycol and mixtures thereof.

In the third embodiment, the solvo-thermal processing comprises processing the third solution at a temperature in the range of 80-120° C. for a time in the range 12-48 hours.

The electrically conductive composite was prepared as described above and tested with various testing methods.

1 mg of sample (MOF-5 or Composite) was dissolved in 3 mL of acetone in a 15 mL beaker. The solution was sonicated until the solid was suspended in the solution. A three electrode chemical cell was prepared using AgCl, Pt, and glassy carbon as reference, counter, and working electrodes respectively (see FIG. 9). The electrolytic solution used contained a total of 5 mL of 0.5 M NaCl. In the polymerization tests, 0.5M of $H_2SO_4$ (which acts as an oxidant for polymerization) was added to the electrolytic solution along with 0.1 M of aniline. 1 nm of sample was put on the surface of the glassy carbon working electrode and various electrochemical tests were conducted.

Both techniques (CV and chronoamperometry) were measured using a potentiostat (Autolab, AUT0302N.FRA2). The electrochemical cell for the CV and chronoamperometry consisted of three electrodes: working (ITO), counter (Pt rod) and reference (Ag/AgCl) electrodes. The Pt rod was placed 1 cm apart from the working electrode. All potentials were referred to the Ag/AgCl electrode.

Powder X-ray diffraction (PXRD) patterns were collected with a Bruker AXS D8 Advanced diffractometer operated at 40 kV and 40 mA with monochromated Cu Kα radiation (1¼1.5406 Å) and with a scan speed of 1 s/step and a step size of 0.05. Structural modeling was performed on Cerius2 software suite. The simulated PXRD patterns were calculated from modeled crystal data using the PowderCell 2.3 software suite. Thermogravimetric analyses (TGA) were performed on a TA Q500 thermal analysis system with the sample held in a platinum pan in a continuous nitrogen flow atmosphere. Fourier transform infrared (FTIR) spectra were obtained by using a Nicolet FT-IR Impact 400 system and KBr pellet samples. Absorption peaks were described as follows: very strong (vs), strong (s), medium (m), weak (w), broad (br), and shoulder (sh). Elemental analysis was performed on a Thermo Scientific FlashEA 1112.

The composite was observed to dry more quickly than the pure MOF-5. As such, it required less amount of washing and time to dry compared to MOF-5. This can be associated to less vacancy in pores and increased hydrophobicity of the material due to the presence of PANi. (See H. S. Nalwa and H. S. Nalwa, "Handbook of nanostructured materials and nanothechnology, Organics, polymers, and biological materials", Academic Press, San Diego, 2000, pp. 501-501-575, incorporated herein by reference in its entirety). Powder X-Ray Diffraction (PXRD) measurements were taken to inspect the crystallinity and structural properties of the composite. The PXRD shown in FIG. 1 clearly indicates that the material is crystalline. The d-spacing, also known as spacing of identical lattice planes, is equal to 10.2 Å. The large spacing (low angle reflections) indicates that the material is porous. (See D. Saha, Z. Bao, F. Jia and S. Deng, "Adsorption of CO(2), CH(4), N(2)O, and N(2) on MOF-5, MOF-177, and zeolite 5A", *Environmental Science & Technology*, 2010, 44, 1820-1826, incorporated herein by reference in its entirety). The reflection angles and intensities resembles that of MOF-5 structure as seen in simulated patterns. (See B. Chen, X. Wang, Q. Zhang, X. Xi, J. Cai, H. Qi, S. Shi, J. Wang, D. Yuan and M. Fang, "Synthesis and characterization of the interpenetrated MOF-5", *Journal of Materials Chemistry*, 2010, 20, 3758, incorporated herein by reference in its entirety). However, the composite shows a lower intensity peak at angle 5.42° as compared to pure MOF-5, because the modeled structure/pattern is considered in absence of a take-up substance in the pores, while the experimental pattern is obtained in the presence of solvent and thus having a take-up substance in the pores. As a result, the positions of the peaks are not affected but the intensities of the peaks are altered.

Figure 2:
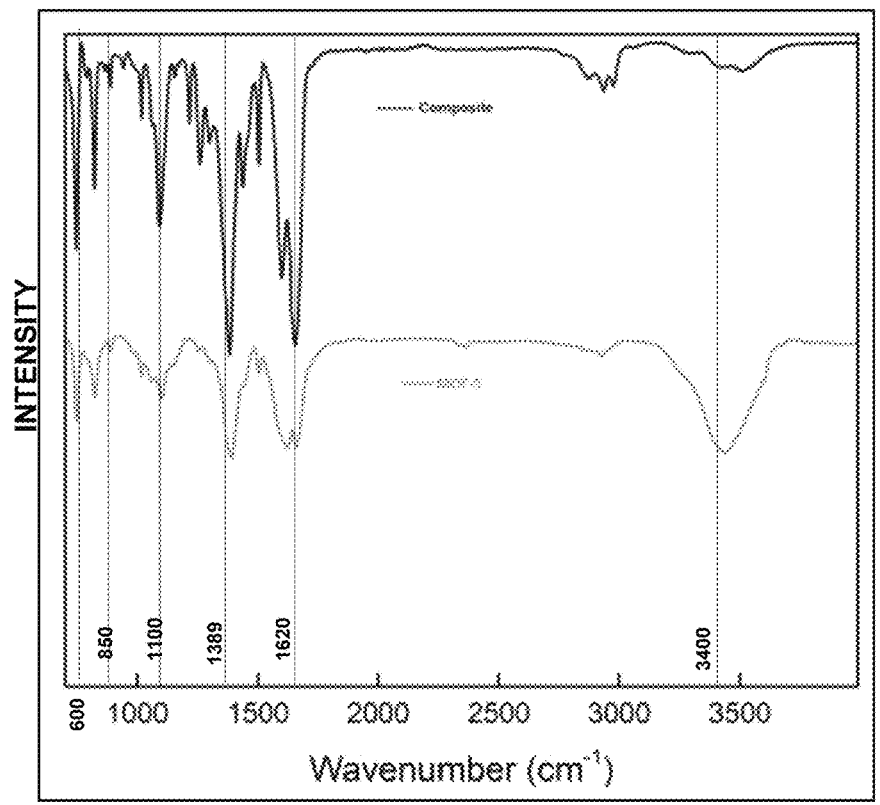
FIG. 2 is a graph illustrating the Fourier Transform Infrared Spectroscopy (FTIR) Spectra for the composite material and MOF-5.

Fourier transform infrared spectroscopy (FTIR) spectra was taken to explore the spectroscopic properties of both samples. The spectra in FIG. 2 demonstrate that MOF-5 is present in both samples. This is clearly seen by the shifts at 1620 and 1389 $cm^{-1}$, which correspond to the symmetric and asymmetric stretches of C—O bonded to the zinc metal respectively. The small peaks seen in the range of 1100 to 850 $cm^{-1}$ correspond to the bending of the C—H group present in the benzene ring of the BDC linker. In addition, the signal around 600 $cm^{-1}$ resembles that of the Zn—O stretch. (See J. P. Coates and P. H. Shelley, "Infrared spectroscopy in process analysis", *Encyclopedia of Analytical Chemistry*, 2006, 10815-10837, incorporated herein by reference in its entirety). Finally, the broad peak around 3400 $cm^{-1}$ of the composite is characteristic of the O—H due to the adsorbed water.

Figure 3:
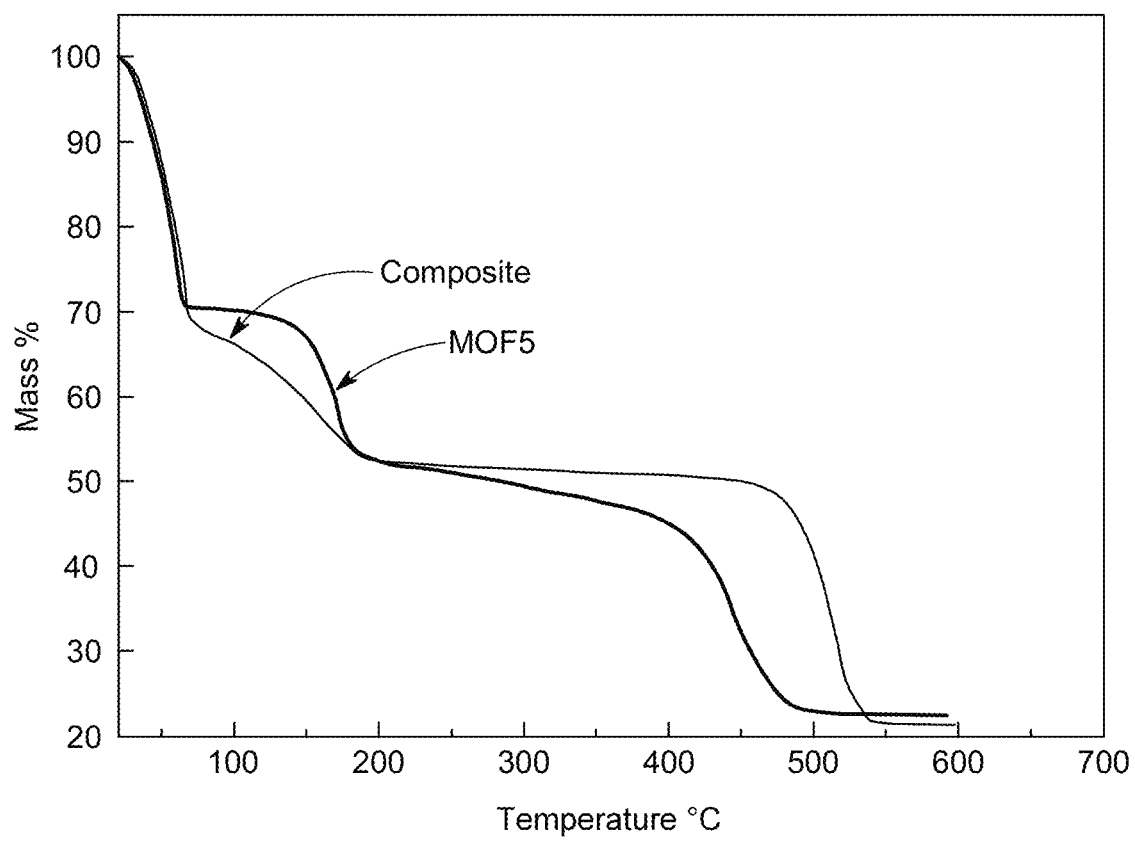
FIG. 3 is a graph illustrating the thermal-gravimetric analysis of the composite and MOF-5.
Figure 4A:
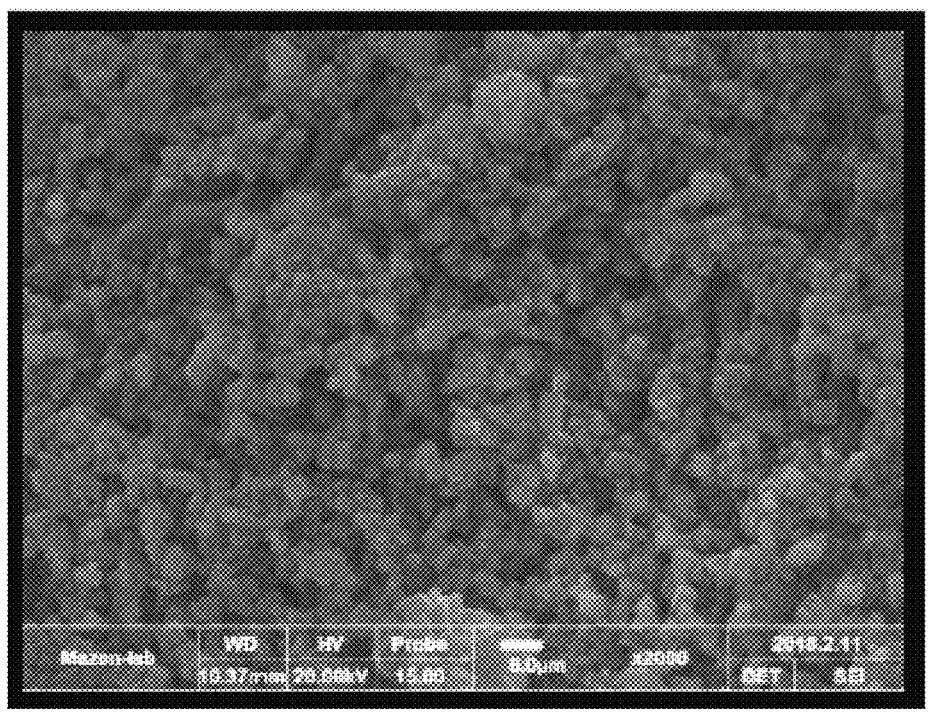
FIGS. 4A-4D illustrate SEM images (all under 20 kV) of the composite shown in (A) at 6 μm, (B) intergrowth of MOF-5 within the composite at 6 μm, (C) intergrowth of MOF-5 within the composite at 2.0 m, and (D) composite at 1.0 μm.
Figure 4B:
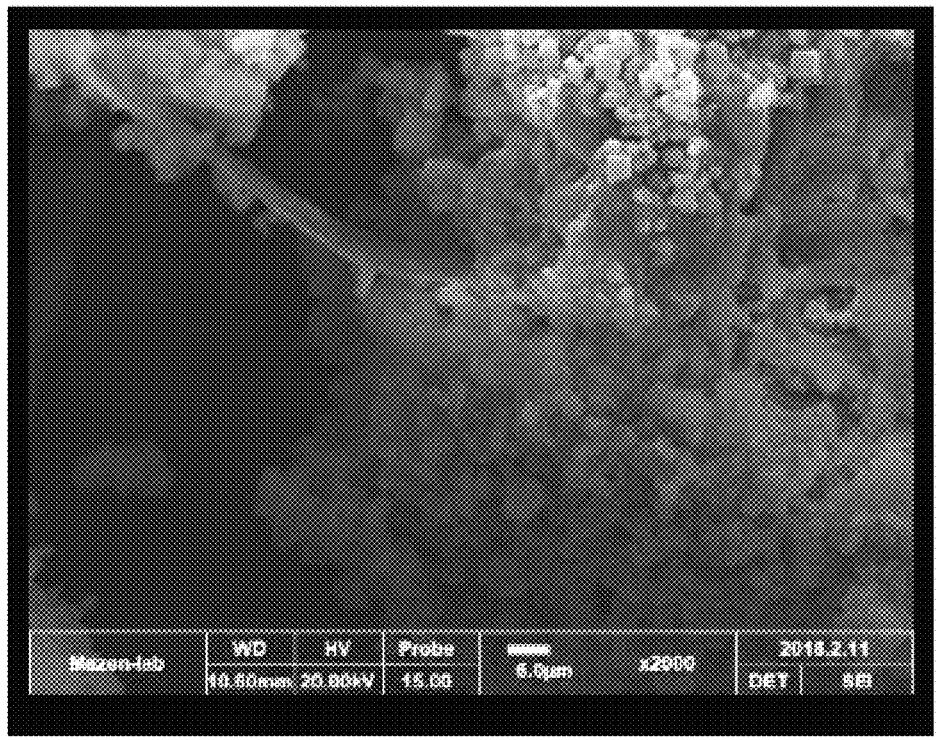
Figure 4C:
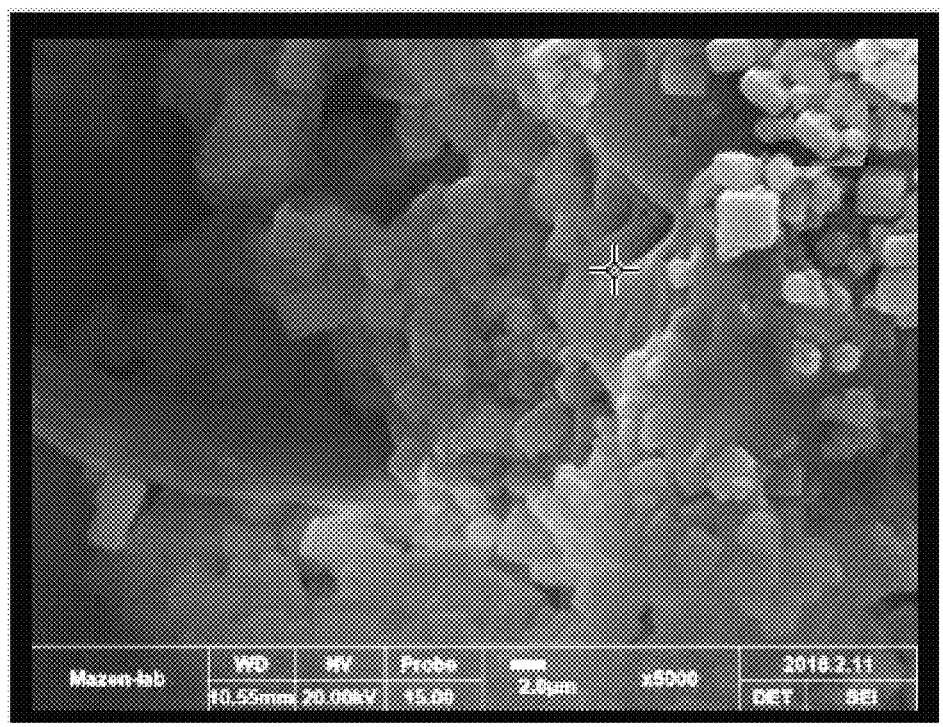
Figure 4D:
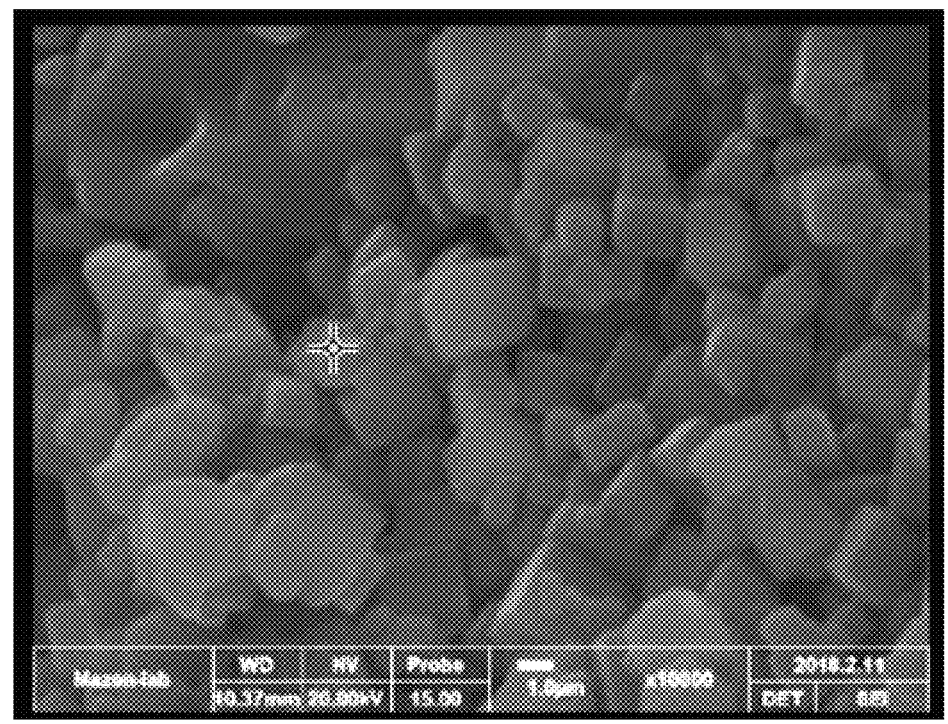

To investigate the thermal stability of the composite material, thermogravimetric analysis (TGA) was conducted on the two samples as shown in FIG. 3.

Thermogravimetric analysis or thermal gravimetric analysis (TGA) is a method of thermal analysis in which the mass of a sample is measured over time as the temperature changes. This measurement provides information about physical phenomena, such as phase transitions, absorption, adsorption and desorption; as well as chemical phenomena including chemisorptions, thermal decomposition, and solid-gas reactions (e.g., oxidation or reduction).

A thermogravimetric analyzer consists of a precision balance with a sample pan located inside a furnace with a programmable control temperature. The temperature is generally increased at constant rate (or for some applications the temperature is controlled for a constant mass loss) to incur a thermal reaction. The thermogravimetric data collected from a thermal reaction is compiled into a plot of mass or percentage of initial mass on the y axis versus either temperature or time on the x-axis. This plot, which is often smoothed, is referred to as a TGA curve. The first derivative of the TGA curve (the DTG curve) may plotted to determine inflection points useful for in-depth interpretations as well as differential thermal analysis.

As shown in FIG. 3, the first mass loss of around 30% is attributed to the solvent used in synthesis of both materials, dimethylformamide (DMF). The rest of the weight loss is attributed to water and the BDC linker. Overall, the composite demonstrates similar thermal stability to that of pristine MOF-5.

In order to examine the components of the composite and their interaction, a scanning electron microscope (SEM) was utilized. The images shown in FIG. 4A-D are the composite material under 20 kV at resolutions of 6 μm, 6 μm, 2 μm, and 1 μm respectively. The cubes observed in the figure illustrate the presence of MOF-5 within the composite material while retaining its crystallinity and structure. In addition, intergrowth of the MOF within the polymer can be observed clearly in images B and C of the figure.

Figure 5:
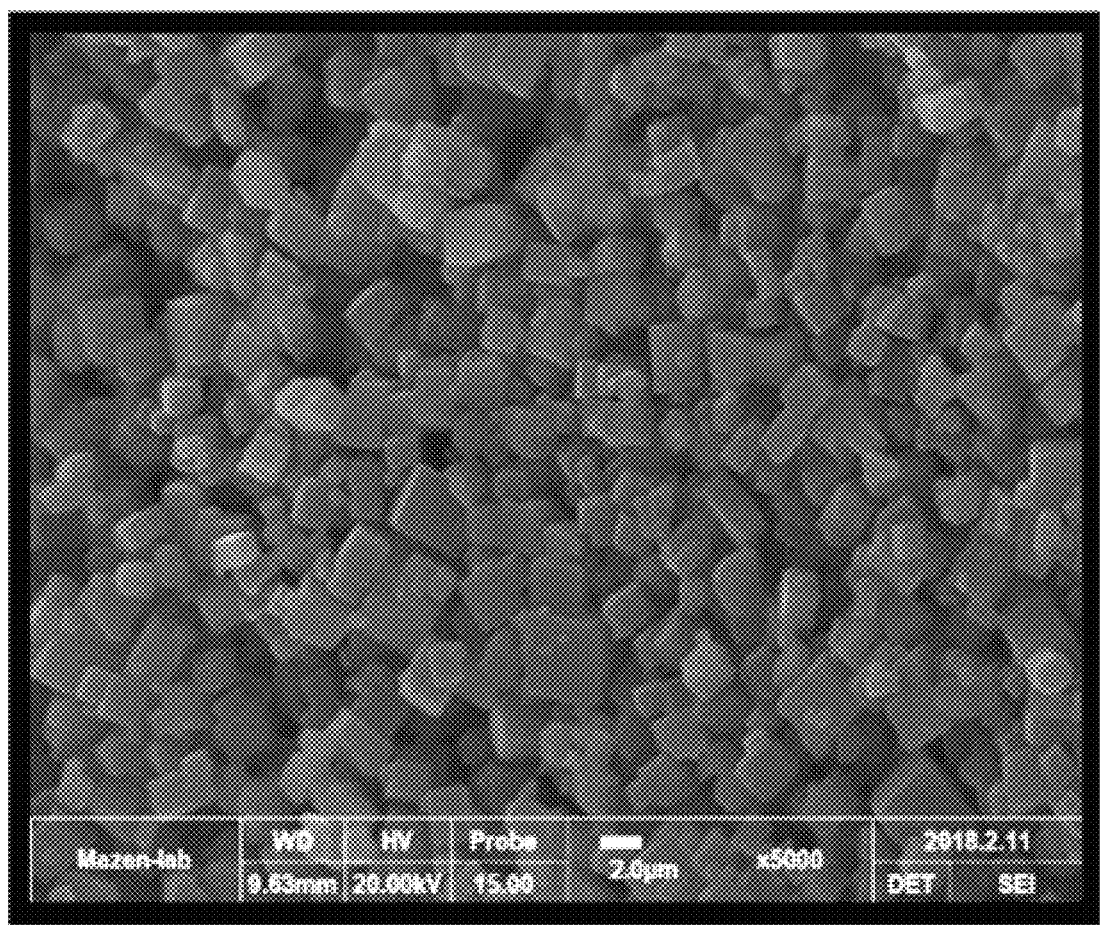
FIG. 5 illustrates an SEM image of MOF-5 shown at 2.0 μm under 20 kV.

FIG. 5 shows an image of MOF-5 without PANi synthesis. The cubes, resembling MOF-5 structure, are clearly seen with no sign of additional components.

Figure 6:
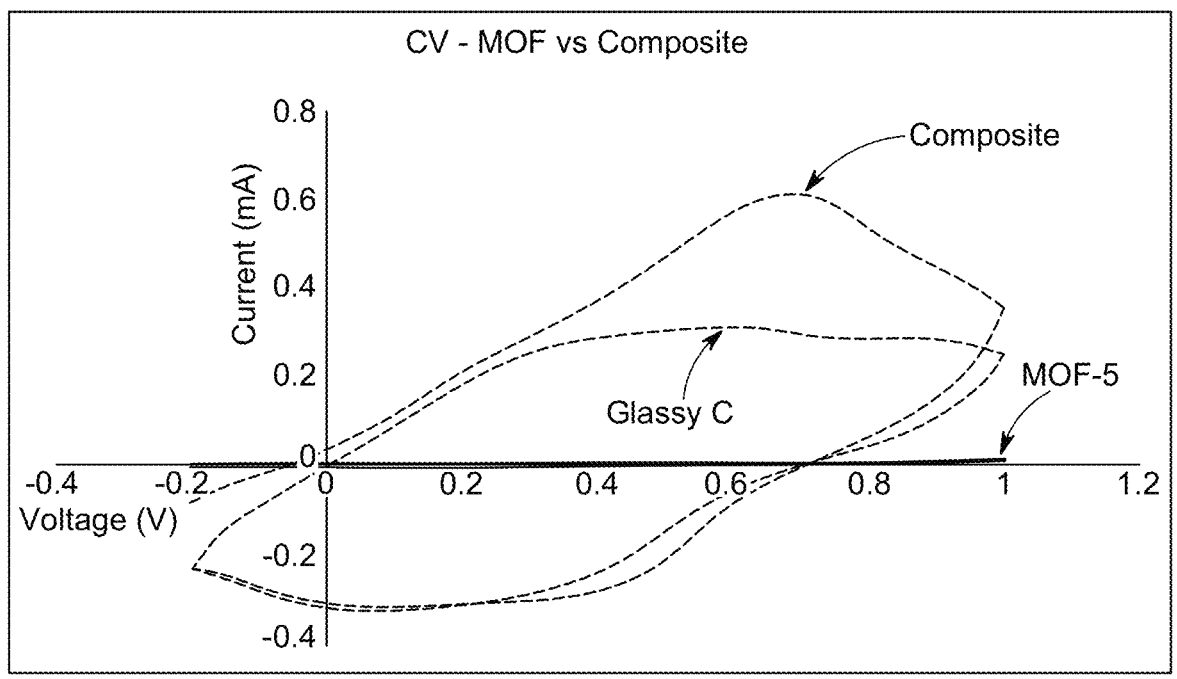
FIG. 6 illustrates the current/voltage cyclic voltammetry graph of MOF-5 and the composite material in 0.5 M of NaCl electrolytic solution taken for two cycles with a scan rate of 0.1 V/s.

After confirming the presence of PANi and MOF-5 in the composite material, various electrochemical tests were carried out to examine the conductivity of the material. In FIG. 6, a cyclic voltammetry technique was measured in an electrochemical cell containing 0.5M NaCl for each sample. (See C. Lu, T. Ben, S. Xu and S. Qiu, *Angewandte Chemie*, 2014, 126, 6572-6576, incorporated herein by reference in its entirety). Two cycles of measurements were taken to confirm the results. The composite demonstrates remarkably higher conductivity than the pristine MOF shown in orange. This is clearly observed by the higher current peaks of composite compared to the relatively flat line (negligible current) of MOF-5.

Figure 7:
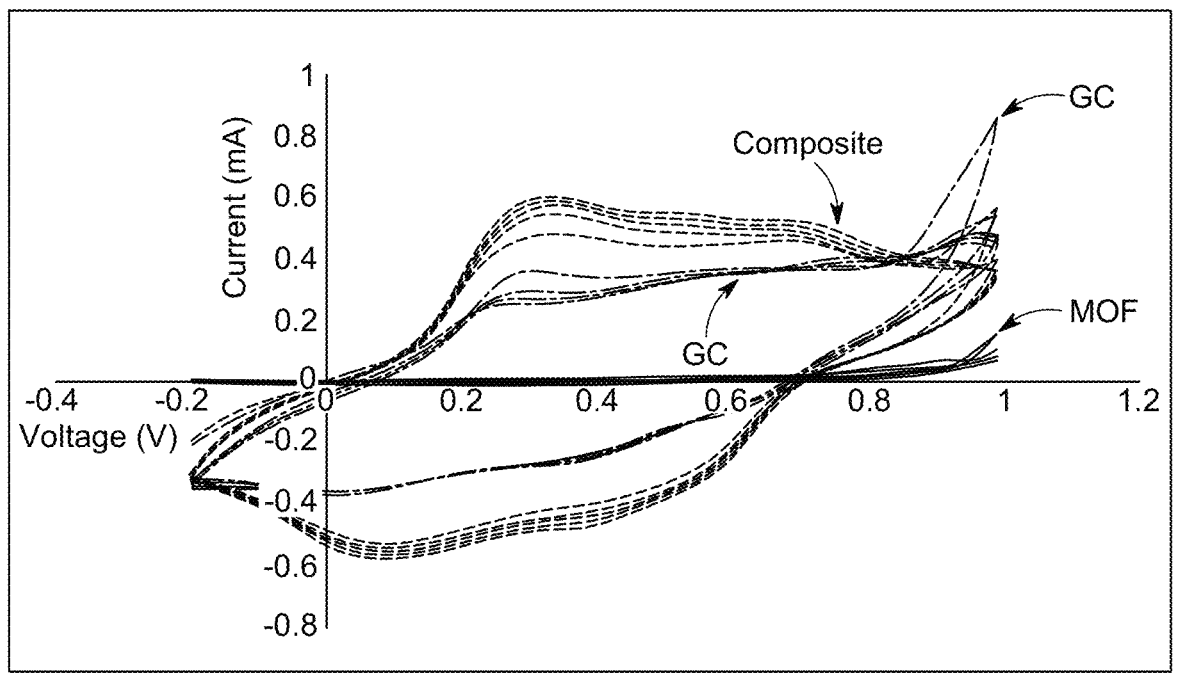
FIG. 7 illustrates the current/voltage cyclic voltammetry graph of the polymerization of PANi on glassy carbon (GC), MOF-5, and composite for 5 cycles at a scan rate of 0.1 V/s.

Furthermore, synthesis of PANi was carried out separately on three different working electrode surfaces; glassy carbon, MOF-5, and composite material shown in FIG. 7 as green, orange, and blue colors respectively. The composite exhibited the highest response and PANi polymerization of the three samples tested. This is suggestive of its high conductivity compared to the other two sample surfaces.

Figure 8:
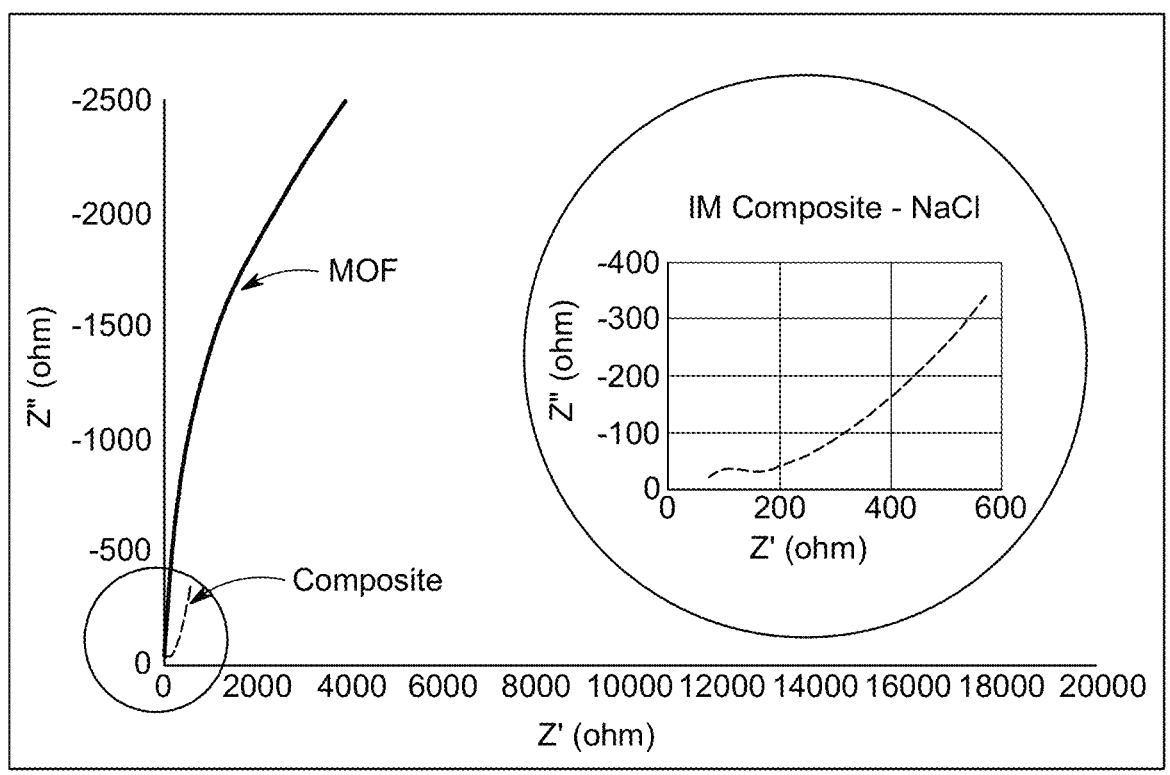
FIG. 8 illustrates an impedance test of MOF-5 and the composite material performed in 0.5 M of NaCl.

Lastly, an impedance test was performed to provide an additional confirmation of the conductivity of the composite. The same electrochemical set up was used in previous CV test. The composite, seen in FIG. 8 in blue color, has much smaller resistance than MOF-5, in the order of magnitude of $10^{-3}$ smaller. As a result, the composite's conductivity is remarkably higher than the pristine MOF. The ionic resistance, $R_{ion}$, for the composite was calculated to be 100.2Ω using the following equation $R_{ion}=3(R_{low}-R_S)$. (See X. Ren and P. G. Pickup, *The Journal of Physical Chemistry*, 1993, 97, 5356-5362, incorporated herein by reference in its entirety). The values of $R_S$ and $R_{low}$ were determined from the graph to be 73.8Ω and 174Ω respectively. The conductivity of the composite ($\sigma_{ion}$) is calculated from $$\sigma_{ion} = \frac{d}{A \cdot R_{ion}} = 4.69 \times 10^{-9} \text{ Scm}^{-1},$$

where A is the area of the electrode and d is the composite sample thickness.

The methods of the present disclosure enhance the conductivity of MOF-5. This method retains the structure, crystallinity, robustness, and thermal stability of the MOF while enhancing its conductivity and electrochemical properties. It is created by successfully incorporating polyaniline into the synthesis pathway of MOF-5 to yield a MOF-polymer composite material. MOF-5 high conductivity materials may be used as key components for batteries and super capacitors, which are important for electrochemical energy storage devices.

Obviously, numerous modifications and variations of the present disclosure are possible in light of the above teachings. It is therefore to be understood that within the scope of the appended claims, the invention may be practiced otherwise than as specifically described herein.

The invention claimed is:

1. An electrically conductive composite material, comprising:
   polyaniline and
   a metal-organic framework having the formula $Zn_4O(BDC)_3$, where BDC is 1,4-benzenedicarboxylate and the metal-organic framework is MOF-5;
   wherein the polyaniline is present in the pores of the MOF-5;
   wherein the electrically conductive composite material has:
   an electric conductivity of about $4.69 \times 10^{-9}$ S cm$^{-1}$,
   an ionic resistance of about 100 ohms, and
   a minor powder x-ray diffraction peak in the range of 5° to 10°.

2. An electrode coated with the electrically conductive material of claim 1.

3. An electromagnetic interference shield formed with the electrically conductive material of claim 1.

4. An electrically conductive composite material, comprising:
   polyaniline and a metal-organic framework, wherein the metal-organic framework is MOF-5;
   wherein the polyaniline is integrated into pores of the MOF-5 and the MOF-5 has a formula $Zn_4O(BDC)_3$, where BDC is 1,4-benzenedicarboxylate;
   wherein the electrically conductive composite material has:
   an electric conductivity of about $4.69 \times 10^{-9}$ S cm$-1$,
   an ionic resistance of about 100 ohms, and
   a minor powder x-ray diffraction peak in the range of 5° to 10°;
   wherein the electrically conductive composite material is obtained by:
   mixing, by sonification, a first solution of polyaniline and dimethylformamide to form a second solution;
   mixing, by sonification, the second solution with 1,4-dicarboxylic acid;
   mixing, by sonification, a third solution of zinc nitrate hexahydrate with dimethylformamide;
   mixing, by sonification, the second and third solutions to form a fourth solution;
   solvo-thermal processing the fourth solution at a temperature in the range of 80-120° C. for a time in the range 12-48 hours;
   cooling the fourth solution; and
   filtering and washing the cooled fourth solution to isolate the electrically conductive composite material.

* * * * *